June 1, 1937. C. A. REIMSCHISSEL 2,082,758
DIE HEAD
Filed Nov. 14, 1935 2 Sheets-Sheet 2
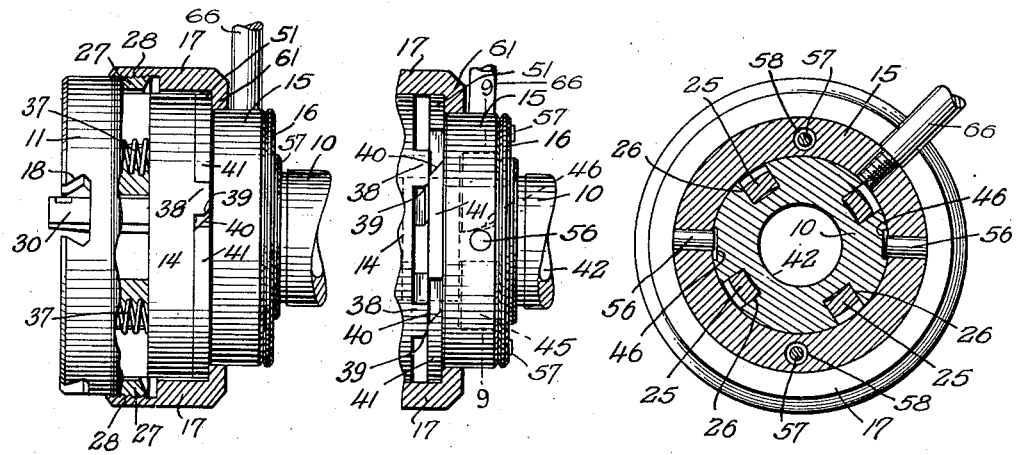
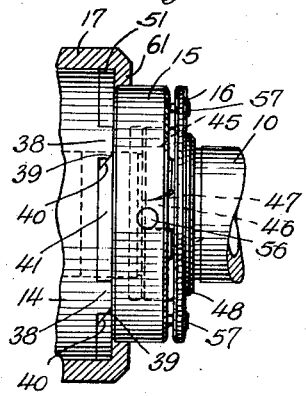
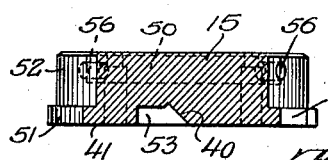
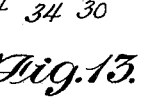
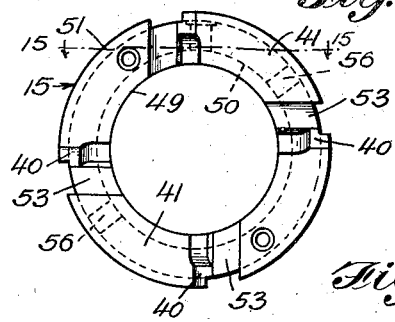
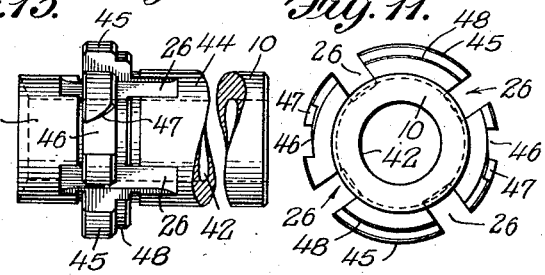
INVENTOR.
C. A. Reimschissel
BY
ATTORNEY.

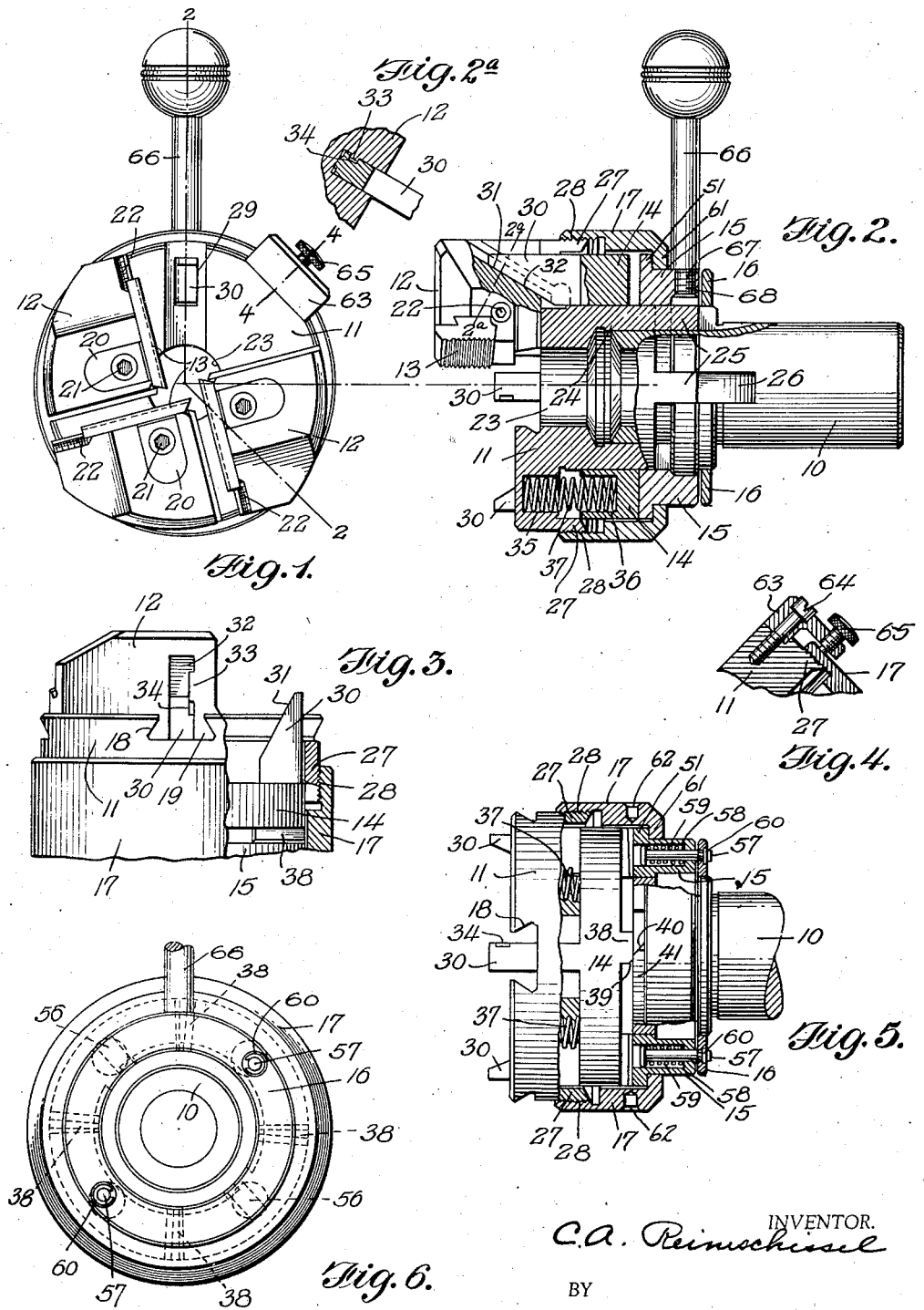

Patented June 1, 1937

2,082,758

UNITED STATES PATENT OFFICE 2,082,758

DIE HEAD

Charles A. Reimschissel, Waynesboro, Pa., assignor to Landis Machine Company, Waynesboro, Pa., a corporation of Pennsylvania Application November 14, 1935, Serial No. 49,804

18 Claims. (Cl. 10—95)

This invention relates to threading die heads and particularly to such die heads as are used for cutting threads on bolts, screws, pipe, etc. using tangential end sharpened chasers and chaser holders such as those shown in Patent No. 1,951,290 which issued to Charles A. Reimschissel and Patent No. 1,951,291 issued to Charles A. Reimschissel and James G. Harper.

An object of the invention is to provide a threading head in which the tangential chasers are mounted in chaser holders that are removable from head, whereby right hand and left hand threads can be generated using same head and chasers but changing from right hand to left hand chaser holders.

Another object of the invention is to provide a threading die head which may be easily adjusted for threads of different size and which when locked in thread cutting position will be rigid so as to cut uniform threads until the thread chasers are released to a non-cutting position.

Another object is to provide means whereby the opening action of the head is obtained by means of stopping the forward travel of the threading head carrying device with respect to the work carrying device, the chasers having formed screw threads on the work. The threading head comprises two units, a front unit carrying the chaser holders and sizing and locking member and a rear unit comprising a holding member upon which the front unit is longitudinally movable and the opening of the dies is effected by a forward movement of the front unit on said rear unit.

Another object of the invention is to provide means for such a longitudinal or floating movement between the front and rear units that will not affect the size of the threads cut on the work, and prevent a partial opening of the die head when used in a hand fed machine such as a turret lathe whereby the operator must feed the die on the work for a full length thread as required.

Another object of the invention is to provide a positive holding or driving means between the supporting shank or driving member and head body to carry resultant force of cut direct from chaser holders, to die head body and to shank or die head support and permit an axial float between shank and head body.

Another object of the invention is to provide for an opening and closing action of the head by means of a hand lever so that the die head can be manually opened at any time during the process of generating a thread and in idle position.

Another object of the invention is to provide a threading head of a rigid construction whereby the resultant force of cut is taken directly from chaser to driving or holding member by positive means.

Further objects and advantages will become apparent from the description which follows.

Referring to the accompanying drawings which are made a part hereof and on which similar reference characters indicate similar parts:

Fig. 1 is a face elevational view of the die head showing one chaser holder removed;

Fig. 2 is a sectional view on line 2—2 of Fig. 1 partly in elevation and all but one chaser holder removed;

Fig. 2a is a sectional view taken on line 2a—2a of Fig. 2;

Fig. 3 is an elevational view partly in section showing one chaser holder mounted thereon;

Fig. 4 is a sectional view taken on line 4—4 of Fig. 1;

Fig. 5 is an elevation partly broken away and parts shown in section showing locking members in locking position for a thread cutting operation, all chaser holders being omitted;

Fig. 6 is a rear view of head showing head with the parts in locked position;

Fig. 7 is an elevation without the chaser holders partly broken away and parts shown in section but showing the locking member in open position;

Fig. 8 is a fragmental sectional view with parts in elevation showing head in locked position and a position of the opening means;

Fig. 9 is a sectional view taken on line 9—9 of Fig. 8;

Fig. 10 is a section view similar to Fig. 8 showing head in unlocked position and another position of the opening means;

Fig. 11 is a face elevational view of the closing ring;

Fig. 12 is a side elevational view of the closing ring;

Fig. 13 is a projected view of a prong of the closing ring;

Fig. 14 is a face elevational view of the locking ring;

Fig. 15 is a sectional view taken on line 15—15 of Fig. 14;

Fig. 16 is a side elevational view of the shank;

Fig. 17 is a rear end view of the shank.

In general, the embodiment shown in the drawings comprises a die head which is adapted to be supported non-rotatably in the holding member such as the carriage of a turret lathe and the work to be threaded is rotated during the cutting of the threads. In this arrangement the work may be arranged to be fed forward into the die head as the threads are cut or the holding member may be arranged to move forwardly as the work is fed into the dies until a thread of the desired length has been generated thereon. The die head in such a lathe or the like operates when the threads are so cut to automatically release the dies from the work by the stopping of the axial movement of the work with respect to the die head supporting member as effected by the co-action of the work and die head moving thereon which is provided for in the construction of the die head. The die head is also provided with a manually operable means for resetting the thread chasers or for releasing them manually when desired.

Referring to the drawings, the die head includes a supporting shank 10 which is held by way of example in the carriage of a turret lathe, a body member 11 which is slidably mounted on shank 10 and chaser holders 12 carrying tangential thread chasers 13. Operating members forming a part of this die head include a closing ring 14, a locking ring 15, a retaining ring 16, and an adjusting ring 17 which determines the diametrical size of the threads to be cut by the chasers carried by the die head.

The head body member 11 is provided with angular slots 18 extending across the front face thereof which slots can be of any desired shape for receiving correspondingly shaped projecting mating members 19 extending from the backs of the chaser holders 12 so that they may slide radially on the face of the body member 11. These chaser holders 12 carry tangential chasers 13 by means of clamps 20 and clamp screws 21 for securing them in place in accordance with adjustments effected by screws 22 at the outer ends of the chasers.

The die head body 11 has a central bore 23 into which threaded work may extend and to the rear thereof is a cylindrical extension 24 having a larger bore so as to be slidably received on the front end of a supporting shank 10 and this cylindrical portion is provided with a plurality of rearwardly extending holding or driving prongs 25 which are slidably received in openings or keyways 26 formed in shank 10. Body 11 is also formed at its periphery with a rearwardly extending cylindrical flange 27 which together with adjusting ring 17 provides a chamber for closing ring 14 and other operating elements. This adjusting ring 17 and flange 27 are connected by a threaded joint afforded by threads 28 as shown so that the ring may be turned on the flange forwardly or rearwardly for adjustments of the diameter of screw threads as required.

Body 11 is provided with radial slots 29 extending into each of said angular slots 18 so that prongs 30 extending from a face of the closing ring 14 may slidably pass therethrough. These prongs each have an inclined surface 31 and chaser holders 12 are each provided with slots 32 having inclined surfaces which cooperate with the inclined surfaces 31 of the prongs 30. These inclined surfaces through a forward or rearward movement of closing ring 14 operate for varying the diameter of the cut by the chaser members from one diameter to another and for bearing the force exerted by the holders 12 during thread cutting operations. Chaser holders 12 each have a key 33 which extends into a keyway 34 formed in each of the prongs and these keys and keyways are arranged parallel to the inclined surfaces 31 of the closing ring prong and chaser holder slots.

These keys and keyways provide means for moving the chaser holders outward away from the work when the die head is being operated to an open position to release the chasers from the threads they have generated, and for outward movement of the chaser holders during the adjusting of the holders for an increased diameter of the cut by the thread chasers.

Closing ring 14 is slidingly mounted on the outer surface of the rearward cylindrical extension 24 of body 11 and is received within the casing provided by the peripheral flange 27 of body 11 and the adjusting ring 17 which provides an extension thereof. The closing ring is thus mounted to slide in the die head with its prongs 30 extending forwardly through the radial slots 29 through the front wall of body 11. Body 11 at points intermediate of these slots is provided with spring openings 35 and closing ring 14 has corresponding spring openings 36, in which cooperating openings 35 and 36 a number of opening springs 37 are mounted. These springs yieldingly urge closing ring rearwardly tending to hold the ring in position to move the chaser holders radially outward to non-threading or releasing positions and the arrangement of the openings 35 and 36 for springs 37 permits the use of longer springs without increasing the overall length of the die head. On the rear face of closing ring 14 are a series of rearwardly extending abutments 38 having inclined edges 39 which cooperate with similarly inclined surfaces 40 at ends of abutments 41 extending from the front end of locking ring 15. The arrangement of the prongs and abutments and other details of the closing ring are best shown in the detail Figures 11, 12, and 13 thereof.

Referring to Figs. 16 and 17 which show the construction of the die head supporting shank 10, it will be noted that this member comprises a hollow support, the major portion of which is cylindrical, with the axial bore 42 of substantially the same diameter as bore 23 of the die head body member 11. This forward extension 43 is cylindrical and of such a diameter as to provide a longitudinal bearing surface for the body member 11 to move axially thereon and its rear end 44 is of somewhat larger diameter. These end portions of the shank are formed with an intermediate collar member 45 interrupted by the openings or keyways 26 formed therein through which prong members 25 of body member 11 extend. The outermost periphery of this interrupted collar member 45 provides a cylindrical bearing surface for locking ring 15 upon which it may have limited longitudinal or axial and rotary movements and its periphery is further interrupted by one or more pin slots 46 having spiral cam surfaces 47 at one end of the slot. This interrupted collar further has a bearing surface 48 of reduced diameter at its rear upon which retaining ring 16 is mounted.

Locking ring 15 is shown in detail in Figs. 14 and 15 but is better shown in its assembled position in Fig. 2 of the drawings. This ring has a central bore 49 which has a bearing engagement on the cylindrical extension 24 of body 11 behind closing ring 14 and is also provided with a larger bore 50 which slidingly engages the outermost peripheral cylindrical surface of collar member 45 of shank 10. The front end of this locking ring is provided with a peripheral flange 51 having an outer diameter substantially the same as closing ring 14 so as to be received within the housing or casing provided by the extending head flange 27 of body member 11 and adjusting ring 17 and back of this flange 51 the locking ring has a cylindrical extension 52 of reduced diameter. The front end of locking ring 15 has a series of abutments 41 formed at slots 53 at intervals around the ring. Each of the slots has an inclined surface 40 provided by cuts at an end of each of the slots; these slots cooperate with the inclined edges 39 of abutments 38 on the closing ring as referred to with reference to the closing ring and are best shown in Figs. 5, 7, 8, and 10. The locking ring also has one or more inwardly projecting pins 56 extending into the bore 50 thereof so as to be positioned in slots 46 in collar member 45 of shank 10 so as to cooperate with cam surfaces 47 at the ends of these slots; the position of these pins in the slots is indicated in Figs. 8, 9, and 10 of the drawings and their cooperation with the inclined surfaces 47 is such as to effect a turning movement of the locking ring as will hereinafter be explained.

It is to be noted that locking ring 15 has its larger bore 50 bearing on the outermost peripheral cylindrical surface of shank collar 45 and retaining ring 16 is mounted on bearing surface 48 thereof. This ring is connected with locking ring 15 by means of connecting pins 57 which are received in connecting pin openings 58 and corresponding openings in the retaining ring. These openings 58 provide housing for connecting pin springs 59 mounted on pins 57 between the heads thereof and the rear wall of the locking ring and the pins 57 may have grooves adjacent to their outer ends for receiving horse shoe washer 60 or any other desired form of retaining members. Springs 59 are thus mounted in the openings 58 under compression for holding locking ring 15 in its assembled position on shank collar 45 and the rearward cylindrical extension 24 of body member 11 which also provides a bearing surface for the collar as hereinbefore set forth.

Adjusting ring 17 has an inwardly extending rear flange 61 which engages back of flange 51 of the locking ring 15 and thereby maintains the operating members assembled on body member 11 of the die head. By rotating ring 17, as provided for by a series of holes 62 shown in Fig. 5 for receiving a pin or wrench for rotating the ring, the relationship of the closing ring with respect to die head body member 11 may be adjusted for projecting closing ring prongs 30 in or out to the desired extent for the adjustment of the chaser holders for cutting threads of the required diameter. As shown in Figs. 1 and 4 body member 11 is provided with a locking bracket 63 attached to the flange 27 by screws 64. A locking screw 65 extends through this bracket so as to engage adjusting ring 17 to lock it in a fixed relationship with respect to die head body 11.

As just described the die head operating and cutting members are held in assembled relationship with each other by means of the adjusting ring 17. These parts carried by the body member constitute the front unit of the die head as distinguished from the rear unit comprising shank 10 upon which the die head body member is slidingly mounted. This front unit has also been shown to be held in position on shank 10 by means of the connection between retaining ring 16 and locking ring 15. Springs 59 in this connection yield to permit the front unit to move forward on the shank and they operate at the ending of the thread cutting operation to carry the front unit back again immediately upon the thread chasers being released from threads they have generated in a piece of work. The die head as shown is provided with chaser holders 12 and chasers 13 for cutting right hand threads. However, left hand threads can be generated using the same head and chasers but changing to left hand holders as will be readily seen; for purposes of illustration right hand holders only are shown in the drawings.

As shown in the assembled views of the die head the chasers are illustrated in thread cutting positions in Fig. 1, 2, and 5 and in this position it will be noted that the flanges 51, and 61 of the locking ring and adjusting ring respectively absorb the force exerted by the chaser holds during the thread cutting operation through closing ring 14 and locking ring 15. In this thread cutting position it will be noted that abutments 38 on the rear of closing ring 14 are positioned against the surfaces of abutments 41 of the locking ring thereby projecting prongs 30 of the closing ring outward to hold the chaser holders and chasers in their cutting positions. The locking ring 15 is provided with a closing lever or handle 66 having a threaded end 67 which engages a correspondingly threaded aperture 68 in the locking ring. This lever may be manually operated if desired to rotate locking ring to position to permit abutments 38 of the closing ring to enter the slots 53 of the locking ring so as to effect an outward movement of the chaser holders to release the chasers from the work, springs 37 expanding to effect the rearward movement of the closing ring to a position as shown in Figs. 7 and 10 for example. However, the die head is adapted for automatic releasing operation as follows:

With the parts in the positions shown in Fig. 8 for example the die head is in closed or threading position in which position the face of the abutments 38 on the closing ring engages the face of the abutments 41 of the locking ring to hold the closing ring in its forward position against compression of springs 37. The thread chasers are in their innermost radial or threading position. Locking ring 15 is held in a fixed endwise relation to head body 11 by flange 61 of the adjusting ring, backing up flange 51 of the locking ring. The adjusting ring is held in endwise relation to head body 11 of the threaded joint 28 between the flange 27 of body 11 and the forward end of adjusting ring 17, locking screw 65 securing the adjustment of the adjusting ring with respect to body member 11.

In the thread cutting operation the die head is non-rotatably supported and the work is turned into the dies for generating threads thereon. Either the support for shank 10 of the die head or the work support is arranged to travel forward during the thread cutting operation. When a thread of the desired length has been generated relative movement, that is forward movement, is stopped as by stopping the holding member such as the carriage of the turret lathe. When this action takes place thread cutting elements continue in the forward direction carrying the front unit of the threading head forward as provided for by the pin and spring connections 57, 59, between retaining ring 16 and locking ring 15, locking ring 15 being a part of the front unit, moves forward therewith, this pin and spring connection permitting an endwise movement between shank 10 and the front unit thereby creates a floating action between the units, and during this forward floating action one or more of the inclined surfaces 47 of slots 46 come into engagement with the head opening pins 56 mounted in locking ring 15 and thereby effect a rotary movement of locking ring 15 until the flat surface of abutments 38 and 41 of the closing ring 14 and locking ring 15 are disengaged so that springs 37 force the closing ring rearwardly. The inclined surfaces of the closing ring abutments acting against the correspondingly inclined surfaces of locking ring 15 cause the locking ring to rotate to unlocked position as shown in Fig. 10. The rearward movement of the closing ring partially withdraws prongs 30 from the chaser holders, the key 33 and keyway 34 being on a parallel line with base of inclined surfaces 31 of prongs 30 and slots 32 move the chaser holders radially outward of the die head to withdraw the chasers from their cutting position. Upon releasing the chasers from the threads generated thereby, springs 59 in the connection between retaining ring 16 and locking ring 15 then pull the front unit of the die head back to open position as shown in Fig. 10.

To close the die head to threading position locking ring 15 is rotated by hand by swinging lever 66 or other suitable means. The rotation of locking ring 15 produces a forward pressure against closing ring 14 through the action of cooperating inclined surfaces on abutments 38 and 41 on the locking ring and closing ring respectively. The rotation of locking ring is continued until the flat surfaces of abutments 38 and 41 overlap when the die head is in threading or locked position as shown in Fig. 8. The forward movement of closing ring 14 projects prongs 30 forward in slots 32 of chaser holders 12 and the inclined surfaces 31 of the prongs and chaser holders force the chaser holders inward toward the axis of the die head to threading position.

Die head body member 11 and driving prong 25 being slidable endwise on the front end 43 of shank 10 and in keyways or openings 26 respectively of the shank 10 permits the die head front unit to move endwise in relation to the shank 10 so that the size of the threads which the head will cut may be changed, as for example, from ½ inch diameter to ⅟₁₆ inch diameter. The changing of size is accomplished by turning the adjusting ring 17, screwing it farther on the head body for changing to a smaller diameter of threads and in the opposite direction for an increased diameter of the threads the head will cut, whereby the same chasers may be used for cutting threads on pieces of work of different diameters.

It will be obvious to those skilled in the art that various changes may be made in my device without departing from the spirit of the invention and therefore I do not limit myself to what is shown in the drawings and described in the specification, but only as indicated by the appended claims.

I claim:

1. A die head having chaser holders radially movable thereon carrying chaser members, said die head having axially movable means thereon for moving the chaser holders and chasers in and out thereon, means carried by the die head and engaging said axially movable chaser moving means for locking the chaser holders and chasers in an inner thread cutting position, a supporting member upon which the die head is axially movable, spring connecting means between said locking means and said supporting means for holding said die head members in a rearward axial position on the supporting member, means for unlocking the chaser holder locking means so as to release them to effect a movement of the chaser holders and chasers from their thread cutting position to an outer released position by a forward movement of the die head upon said supporting member, and spring means for moving said chasers to their outer position when said locking means is moved to unlocked position.

2. A die head comprising a body member having a plurality of radial slots in one end and a plurality of prongs on opposite end, chaser holders slidably mounted in said slots, tangential chasers mounted in said holders, a closing ring positioned about said body member and having means engageable with said chaser holders for moving said holders radially of the body member when said closing ring is moved axially thereof, a rear supporting unit for the die head, means carried by the body member for holding said closing ring in a fixed position axially of the body member independent of said supporting unit, yieldable means between said holding means and the supporting unit maintaining the die head members in a rearward axial position on the supporting unit, means for releasing said holding means by a forward movement of the die head members on said rear supporting unit, means for moving said closing ring axially of the body member when said holding means is released to move the chaser holders to open or non-threading position, and means for varying the axially fixed position of closing ring.

3. A die head comprising a body member, a plurality of chaser holders slidably mounted on one end of the body member, tangential chasers mounted on said holders, a closing ring mounted on the body member, a locking ring mounted on the body member, an adjusting ring mounted over the locking and closing rings, said adjusting ring attached to the body member by a threaded joint, and said adjusting ring providing means for holding the closing ring and locking rings in axially fixed position with respect to the body member and for changing said axially fixed position.

4. A die head comprising a body member, a plurality of chaser holders slidably mounted on one end of body member, tangential chasers mounted on said holders, closing and locking rings mounted on said body member, a ring connected to the body extending over said closing ring and connected to said locking ring with a bearing engagement to hold the rings assembled on the body member, said closing and locking rings having a series of abutments on their mating faces with cam surfaces to provide means for forcing the closing ring into locking position by rotating the locking ring, and a handle on said locking ring for closing or opening the die head either to threading or non-threading position.

5. A die head comprising a hollow body member having a plurality of radial slots in one end and a plurality of holding and driving prongs on its opposite end, chaser holders slidably mounted in said slots, tangential chasers mounted in said holders, closing and locking rings positioned about body member, a supporting member having a pilot fitting in the hollow body member and a series of peripheral slots that mate with the prongs of the head body member as means of taking resulting force of a cut from the die head body member to the supporting member, and a retaining ring mounted on said supporting member connected to the body member for holding it on the supporting member.

6. A die head comprising a body member with an enlarged head face, a plurality of chaser holders with chasers thereon, means for mounting said chaser holders to slide radially on said head face, said enlarged head face having a rearwardly extending peripheral flange, a closing ring extending into said peripheral flange and having prongs thereon extending through the head face and engaging said chaser holders so as to move them radially in and out on said head face, springs in the die head to force said closing ring rearwardly with respect to the chasers, a locking ring behind said closing ring, cooperating means between said closing ring and locking ring whereby the locking ring may be actuated to move said chaser holders to a thread cutting position by a forward movement of the closing ring, an adjusting ring extending from said peripheral flange over said closing and locking rings and having bearing connection with the locking ring, and a threaded connection between said adjusting ring and said peripheral flange of the body member to form a joint therewith and provide means for changing the radial position of the chaser holders on the die head face for changing the chasers from one diameter to another whereby work having different diameters can be threaded with the same thread chaser elements.

7. A die head comprising a front unit including a body member, thread cutting elements carried thereby, a closing ring, a locking ring, a supporting member comprising a rear unit adapted to be carried forward with respect to a piece of work as the threading of the work progresses, said body member having a series of extending prongs which mate in openings in the holding member providing means for a forward movement of the front unit on the holding member when the holding member is stopped in its forward travel with respect to the work piece while the thread cutting elements are generating a thread on a piece of work, a retaining ring on said holding member, a connection between said locking ring and said retaining ring for holding them together comprising connecting pins and springs which permit the front unit to move forwardly with respect to the rear unit and for moving the front unit back again after the die head has completed its thread.

8. A die head comprising a body member having chaser holders and chasers movably mounted thereon, a closing ring mounted for axial movement on the body member and cooperating with the chaser holders for moving them radially in and out on the body member, a locking ring movably cooperating with said closing ring for operating the closing ring to thread cutting locked position and permitting it to move to unlocked or released position to open the chaser holders and chasers, opening springs positioned between the body member and closing ring to provide means for forcing the closing ring to its open or release position when the locking ring has been moved to a position permitting the chasers to open, and an adjusting ring connecting the body member and locking ring to hold the die head members assembled and adjustable to vary the diameter of the threads cut by the chasers.

9. A die head comprising a body member having chaser holders and chasers movably mounted thereon, a closing ring mounted for axial movement on the body member and cooperating with the chaser holders for moving them radially in and out on the body member, a locking ring movably cooperating with said closing ring for operating the closing ring to thread cutting locked position and permitting it to move to locked or released position to open the chaser holders and chasers, opening springs positioned between the body member and closing ring to provide means for forcing the closing ring to its open or release position when the locking ring has been moved to a position permitting the chasers to open, a hand lever on said locking ring for moving it to locked and unlocked positions, and an adjusting ring connecting the body member and locking ring to hold the die head members assembled and adjustable to vary the diameter of the threads cut by the chasers.

10. A die head comprising a body member having chaser holders and chasers movably mounted thereon, a closing ring mounted for axial movement on the body member and cooperating with the chaser holders for moving them radially in and out on the body member, a locking ring movably cooperating with said closing ring for operating the closing ring to thread cutting locked position and permitting it to move to unlocked or released position to open the chaser holders and chasers, opening springs positioned between the body member and closing ring to provide means for forcing the closing ring to its open or release position when the locking ring has been moved to a position permitting the chasers to open, a hand lever on said locking ring for moving it to locked and unlocked positions, cam means for moving said locking ring to unlocked position, and an adjusting ring connecting the body member and locking ring to hold the die head members assembled and adjustable to vary the diameter of the threads cut by the chasers.

11. A die head comprising a body member having chaser holders and chasers movably mounted thereon, a closing ring mounted for axial movement on the body member and cooperating with the chaser holders for moving them radially in and out on the body member, a locking ring rotatably cooperating with said closing ring for operating the closing ring to thread cutting locked position and permitting it to move to unlocked or released position to open the chaser holders and chasers, opening springs positioned between the body member and closing ring to provide means for forcing the closing ring to its open or release position when the locking ring has been moved to a position permitting the chasers to open, a hand lever on said locking ring for rotating it to locked and unlocked position, cam means for rotating said locking ring to unlocked positions, and an adjusting ring connecting the body member and locking ring to hold the die head members assembled and adjustable to vary the diameter of the threads cut by the chasers.

12. A die head comprising a body member having radially movable chasers, an axially movable member for moving the chasers radially into and out of thread cutting positions, a locking member cooperating therewith for effecting the movement of the chasers to a locked thread cutting position, spring means between said chaser moving member and the die head body member for effecting a retracting movement of the chasers to released or non-thread cutting position, and an assembling ring connected to said die head body member extending over and enclosing said chaser moving member and connected with a bearing engagement to said locking member.

13. A die head comprising a body member having radially movable chasers, an axially movable member for moving the chasers radially into and out of thread cutting positions, a locking member cooperating therewith for effecting the movement of the chasers to a locked thread cutting position, spring means between said chaser moving member and the die head body member for effecting a retracting movement of the chasers to released or non-thread cutting position, an assembling ring connecting said body member with said locking member and enclosing said chaser moving means, a supporting member upon which said body member is axially movable, connecting means between said locking member and said supporting member retaining said body member thereon but yieldable to permit a forward movement thereof, and means engageable with said locking member to effect a movement of the chasers to released position upon such forward movement of the body member.

14. A die head comprising a body member having radially movable chasers and chaser moving members, a rear supporting unit therefor comprising a shank with a collar thereon inward of its front end, means for mounting a die head so as to move axially on said shank forwardly of said collar, a retaining ring on said shank in cooperative engagement with said collar, and yieldable connecting means between said retaining ring and said die head members.

15. A die head comprising a body member having radially movable chasers and chaser moving members, a rear supporting unit therefor comprising a shank with a collar thereon inward of its front end, means for mounting a die head so as to move axially on said shank forwardly of said collar, a retaining ring on said shank in cooperative engagement with said collar, yieldable connecting means between said retaining ring and said die head members permitting the die head to move forwardly on the front end of the shank member, and means cooperating with the chaser moving members to effect an opening of the chasers when the die head moves forwardly on said supporting member.

16. In a threading die the combination of a front unit, a rear unit for supporting the front unit and comprising a shank having stop means thereon inwardly of its front end, means for mounting said front unit to move axially on said shank forwardly of said stop means, a retaining ring on said shank in cooperative engagement with said stop means, and yieldable connecting means between said retaining ring and said front unit.

17. In a threading die, a front unit, a rear unit comprising a shank with a stop thereon inwardly of its front end for limiting the movement of the front unit rearwardly along the rear unit, means for mounting said front unit on said shank to move forwardly of said stop, a retaining ring on said shank in cooperative engagement with said stop for limiting the forward movement of the front unit on the rear unit and yieldable connecting means between said retaining ring and said front unit for permitting the front unit to move forwardly of the rear unit opposed by the said yieldable means, and thread cutting means carried by said forward unit, the construction providing for a fixed position of the rear unit and a floating front unit supported to permit it to follow a non-concentric path during cutting operation but supported from the rear unit in a manner to provide an exact cut.

18. In a thread cutting die a front unit, a rear unit, thread cutting means on said front unit movable between closed and open positions, means for locking said thread cutting means in closed thread cutting position, means for connecting said front and rear units to provide a positive drive therebetween, and cooperating retaining ring and stop means on said front and rear units limiting the movement of the front unit forwardly of the rear unit, said connecting means permitting the front unit to move forwardly of the rear unit without disturbing said positive drive or the locking action of the cutters.

CHARLES A. REIMSCHISSEL.